(12) United States Patent
Brodersen

(10) Patent No.: US 12,491,803 B2
(45) Date of Patent: Dec. 9, 2025

(54) ACTIVE SUSPENSION SYSTEM

(71) Applicant: SEARS MANUFACTURING CO., Davenport, IA (US)

(72) Inventor: Cole Thomas Brodersen, Davenport, IA (US)

(73) Assignee: SEARS MANUFACTURING CO., Davenport, IA (US)

(*) Notice: Subject to any disclaimer, the term of this patent is extended or adjusted under 35 U.S.C. 154(b) by 352 days.

(21) Appl. No.: 18/034,910

(22) PCT Filed: Nov. 9, 2021

(86) PCT No.: PCT/US2021/058534
§ 371 (c)(1),
(2) Date: May 2, 2023

(87) PCT Pub. No.: WO2022/099168
PCT Pub. Date: May 12, 2022

(65) Prior Publication Data
US 2024/0001826 A1  Jan. 4, 2024

Related U.S. Application Data

(60) Provisional application No. 63/111,307, filed on Nov. 9, 2020.

(51) Int. Cl.
*B60N 2/50* (2006.01)
(52) U.S. Cl.
CPC ............ *B60N 2/501* (2013.01); *B60N 2/502* (2013.01); *B60N 2/508* (2013.01)
(58) Field of Classification Search
CPC ......... B60N 2/501; B60N 2/502; B60N 2/525
See application file for complete search history.

(56) References Cited

U.S. PATENT DOCUMENTS

| 6,120,082 A * | 9/2000 | Vandermolen | B60N 2/508 |
| | | | 296/68.1 |
| 10,850,651 B2 * | 12/2020 | Tucker | B60N 2/548 |

(Continued)

FOREIGN PATENT DOCUMENTS

| JP | 2009023580 A | 2/2009 |
| JP | 2017218149 A | 12/2017 |

OTHER PUBLICATIONS

JP 2009023580 A with English translation; date filed Jul. 23, 2007; date published Feb. 5, 2009. (Year: 2009).*

(Continued)

*Primary Examiner* — Calvin Cheung
(74) *Attorney, Agent, or Firm* — Goodhue, Coleman & Owens, P.C.

(57) ABSTRACT

A vehicle seat suspension system including a base housing, a platform housing, and a linkage system moveably mounted between the base housing and the platform housing. The linkage system includes a center linkage, a rotary actuator drive system moveably connected to the center linkage where the rotary actuator drive system moves the center linkage over a range of travel, and a control system, where the control system actively signals the rotary actuator drive system to move the center linkage in a substantially linear relationship between an angle of rotation of the rotary actuator drive system and a vertical movement of the platform housing. The suspension system may also include sensors in operable communication with the control system.

16 Claims, 11 Drawing Sheets

(56) References Cited

U.S. PATENT DOCUMENTS

| | | | |
|---|---|---|---|
| 11,987,156 B2 * | 5/2024 | Lorey | B60N 2/162 |
| 2004/0089488 A1 * | 5/2004 | Bremner | B60R 21/01554 |
| | | | 180/89.13 |
| 2006/0237885 A1 * | 10/2006 | Paillard | F16F 15/0232 |
| | | | 296/65.02 |
| 2007/0278723 A1 | 12/2007 | Shoemaker et al. | |
| 2015/0232005 A1 | 8/2015 | Haller et al. | |
| 2018/0178690 A1 * | 6/2018 | Castillo | B60N 2/002 |
| 2020/0031256 A1 * | 1/2020 | Werhahn | B60N 2/164 |

OTHER PUBLICATIONS

International Search Report and Written Opinion, PCT/US2021/058534, Mar. 2, 2022, 10 Pages.

* cited by examiner

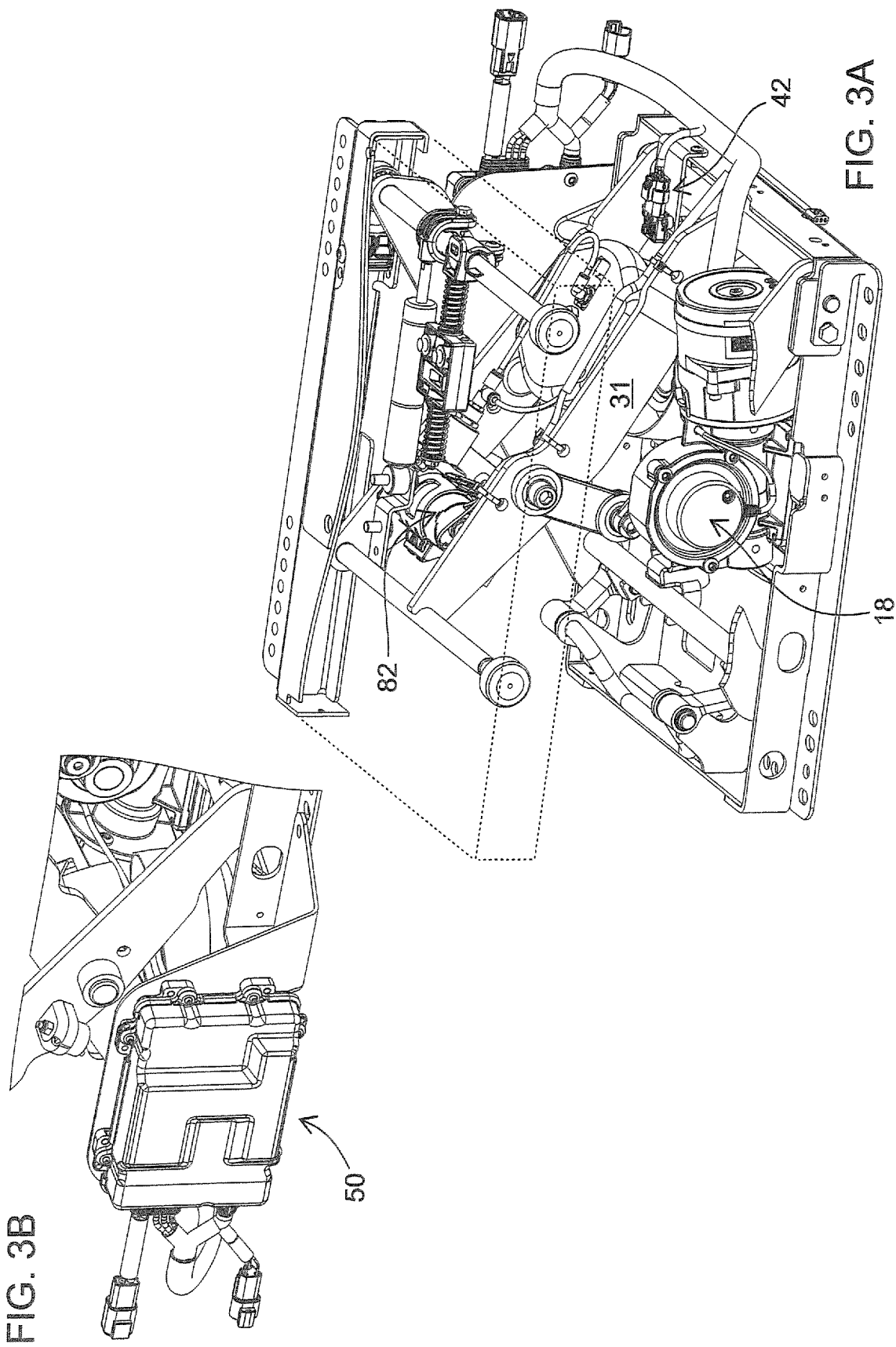

ACTIVE SUSPENSION SYSTEM

CROSS REFERENCE TO RELATED APPLICATIONS

This application is a national stage application filed under 35 U.S.C. § 371 of PCT/US21/58534, which was filed on Nov. 9, 2021, which claims the benefit of U.S. provisional application entitled Active Suspension System, U.S. Ser. No. 63/111,307, filed Nov. 9, 2020, which is hereby incorporated by reference in its entirety.

TECHNICAL FIELD

This invention relates to active suspensions, and more specifically to improvements in active suspensions for vehicle seats in work vehicles.

BACKGROUND

Active seat suspensions, which adjust seats through active seat suspension ride control, are known. In the active mechanisms known in the art, such as that in U.S. patent application Ser. No. 11/020,490, a hydraulic actuator is coupled between a seat and a base. An accelerometer is attached to the base and generates a base acceleration signal based on motion of the base. A control unit then actively controls the hydraulic actuator as a function of this signal. Other systems, such as the ones in U.S. Pat. Nos. 4,363,377 and 6,371,459, include electro-hydraulically controlled actuators working in parallel with a resilient device, such as a spring or air bag. U.S. Pat. No. 6,000,703 (Schubert et al.), issued Dec. 14, 1999, discloses an active cab or seat suspension control system with a hydraulic actuator in parallel with a pneumatic air spring or air bag.

However, in the prior art, the movement of the active suspension is controlled by an actuator that is off-set from the center of the suspension mechanism. This lack of balance often leads to linkage twist, which can be perceived as poor quality and looseness and can additionally lead to premature wear, fatigue and structural failure of the suspension. Furthermore, the active suspensions known in the art are often bulky and unable to package into low profile seat suspensions, which are commonly used in vehicles with space restraints.

Therefore there is a continuing need for active suspension mechanisms that meet manufacturers' ever increasing demands for compactness and comfort. Additional needs exist for active suspensions whose suspension and ride characteristics can be easily modified. It would thus be highly desirable for an active seat suspension to provide maximum height adjustment and compactness while also providing a desired force-deflection linear relationship. The present disclosure describes an economical, compact and conveniently electrically actuated seat suspension having many of the functional characteristics currently required.

SUMMARY

The present disclosure is directed to an active seat suspension system that actively adjusts a suspension based on input of a variety of acceleration and position measurements to a controller, which then outputs a signal to a rotary actuator to move a center linkage of a suspension. The active seat suspension system comprises a base housing, a platform housing, a linkage system, a rotary actuator drive system and a control system all in operable communication.

A method for running the system is also contemplated.

Other aspects will become apparent by consideration of the detailed description and accompanying drawings.

DESCRIPTION OF THE DRAWINGS

The novel features of the present disclosure are set forth in the appended claims. However, certain embodiments, together with further objects and attendant advantages, are best understood by reference to the following detailed description taken in connection with the accompanying drawings in which:

FIG. 3A is a perspective view of the rotary drive actuator system and controller with parts removed for clarity;

FIG. 3B shows attachment of the controller in the disclosed suspension system;

DETAILED DESCRIPTION

Figure 1:
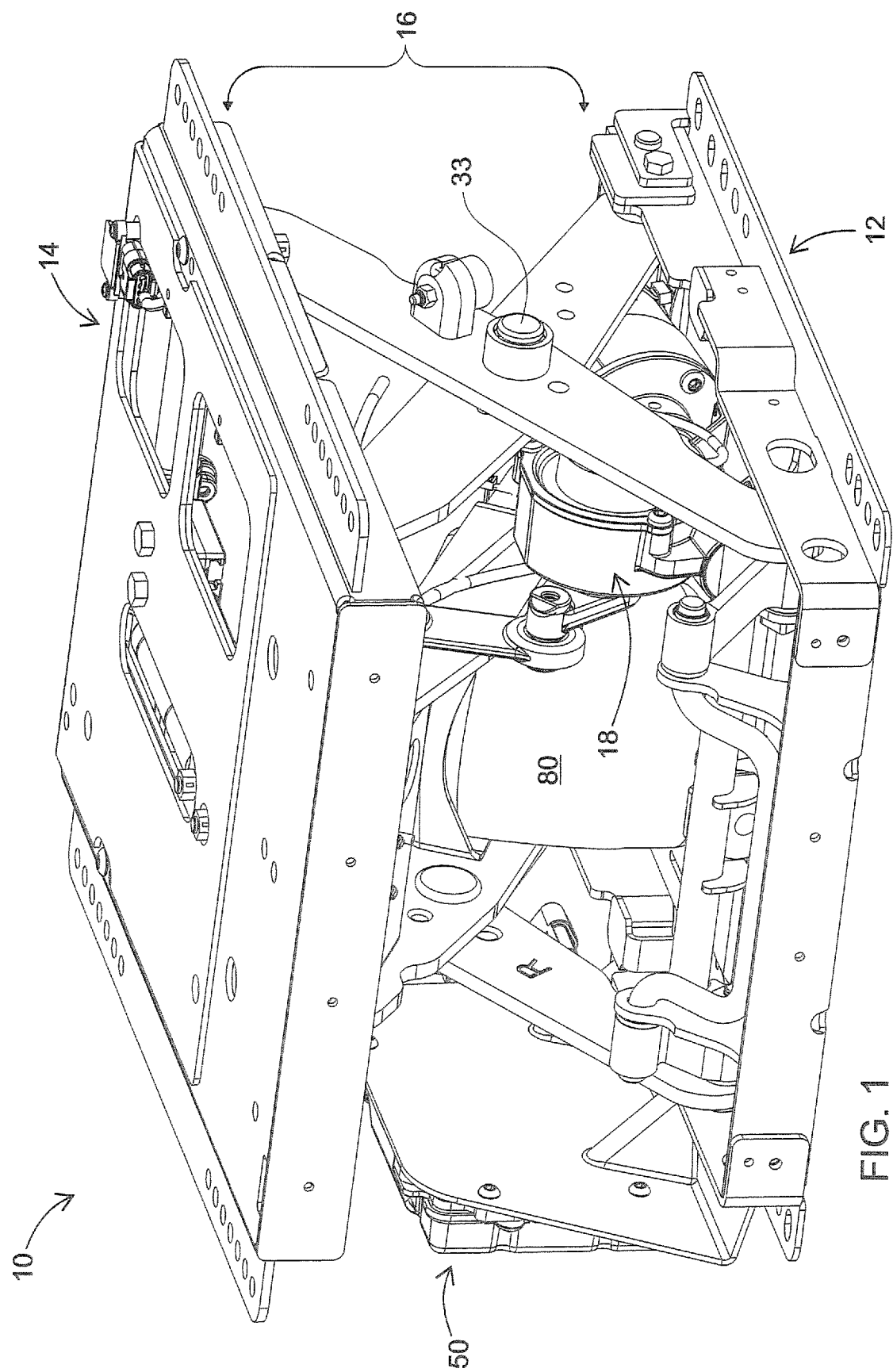
FIG. 1 is a perspective view of the disclosed suspension system embodying the invention.

Referring to FIG. 1, the suspension system 10 includes a base housing 12 for mounting to a vehicle, a platform housing 14 adapted to support a seat, a linkage system 16 adapted to moveably support the platform housing with respect to the base housing, a rotary actuator drive system 18 and a controller 50.

Figure 2A:
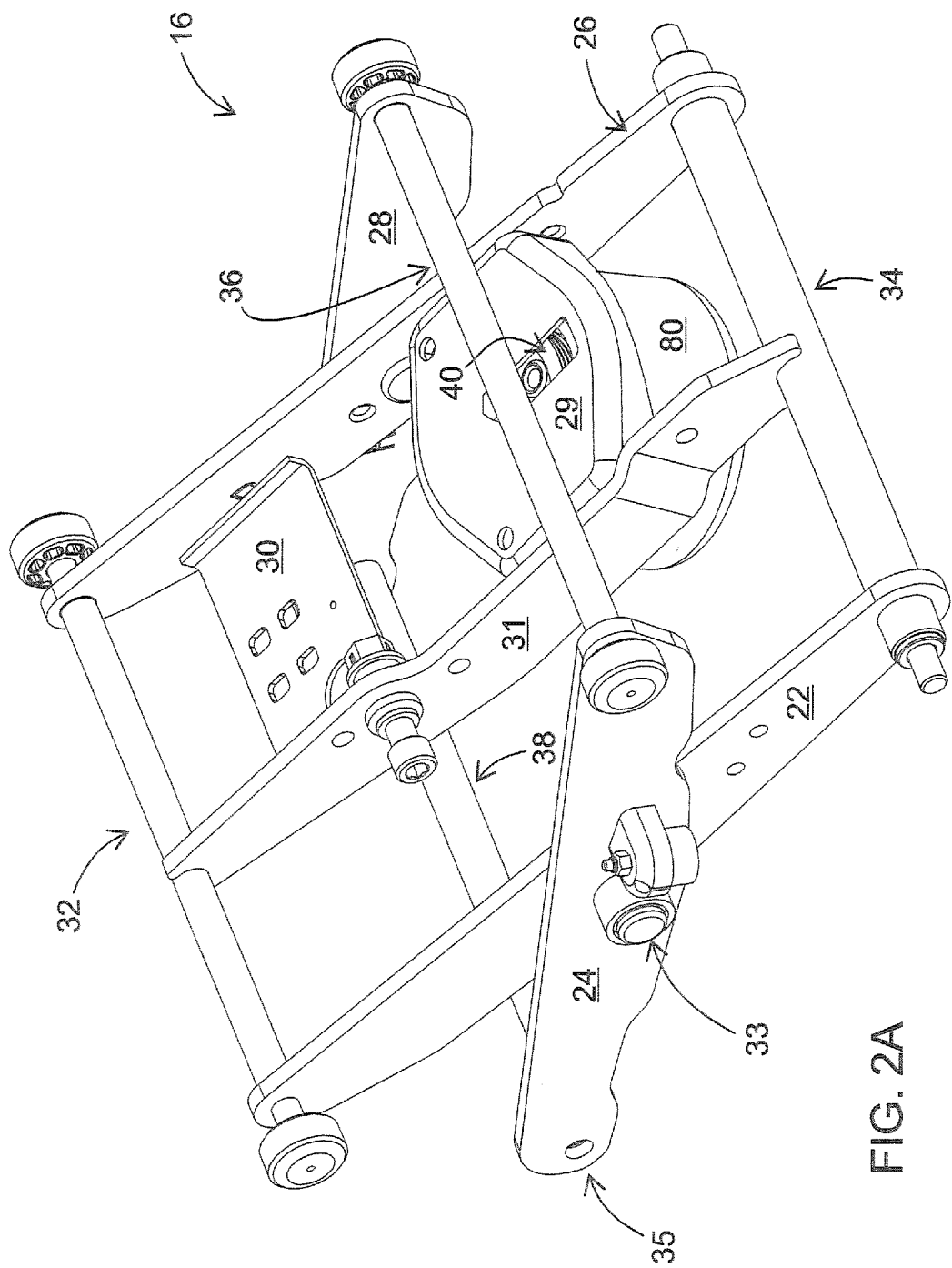
FIG. 2A is a perspective view of the linkage system with parts removed for clarity.

As will be apparent to those of ordinary skill in the art, linkage system 16 works to provide height adjustment and suspension movement of platform housing 14 relative to base housing 12. As demonstrated in FIG. 2A, in one embodiment, linkage system 16 includes a pair of first outer arms 22 and 24, a pair of second outer arms 26 and 28 and center linkage 30. In FIG. 2A, demonstrates an optional center cap 29. In another embodiment (not shown), center linkage 30 is an integral member extending along the upper length of the system and is connected to an upper cross bar 32. This embodiment does not include center cap 29. Arms 22 and 26 are interconnected by upper cross bar 32 and a lower cross bar 34. Arms 24 and 28 are interconnected by upper cross bar 36 and a lower cross bar 38. In most embodiments, arms 22 and 24 and 26 and 28 cross, creating an X-shape and pivot at point 33. This is commonly referred to as a scissor suspension. The lower ends of arms 24 and 28 are pivotally coupled to base housing 12 at a pivot at point 35. Lower ends of arms 22 and 26 are pivotally connected to base housing 12 (not shown). The upper ends of arms 22, 24, 26, and 28 are pivotally and slidably connected to platform housing 14. Lower ends of arms 22, 24, 26, 28 can only rotate whereas upper ends of all four arms have further movement.

Figure 2B:
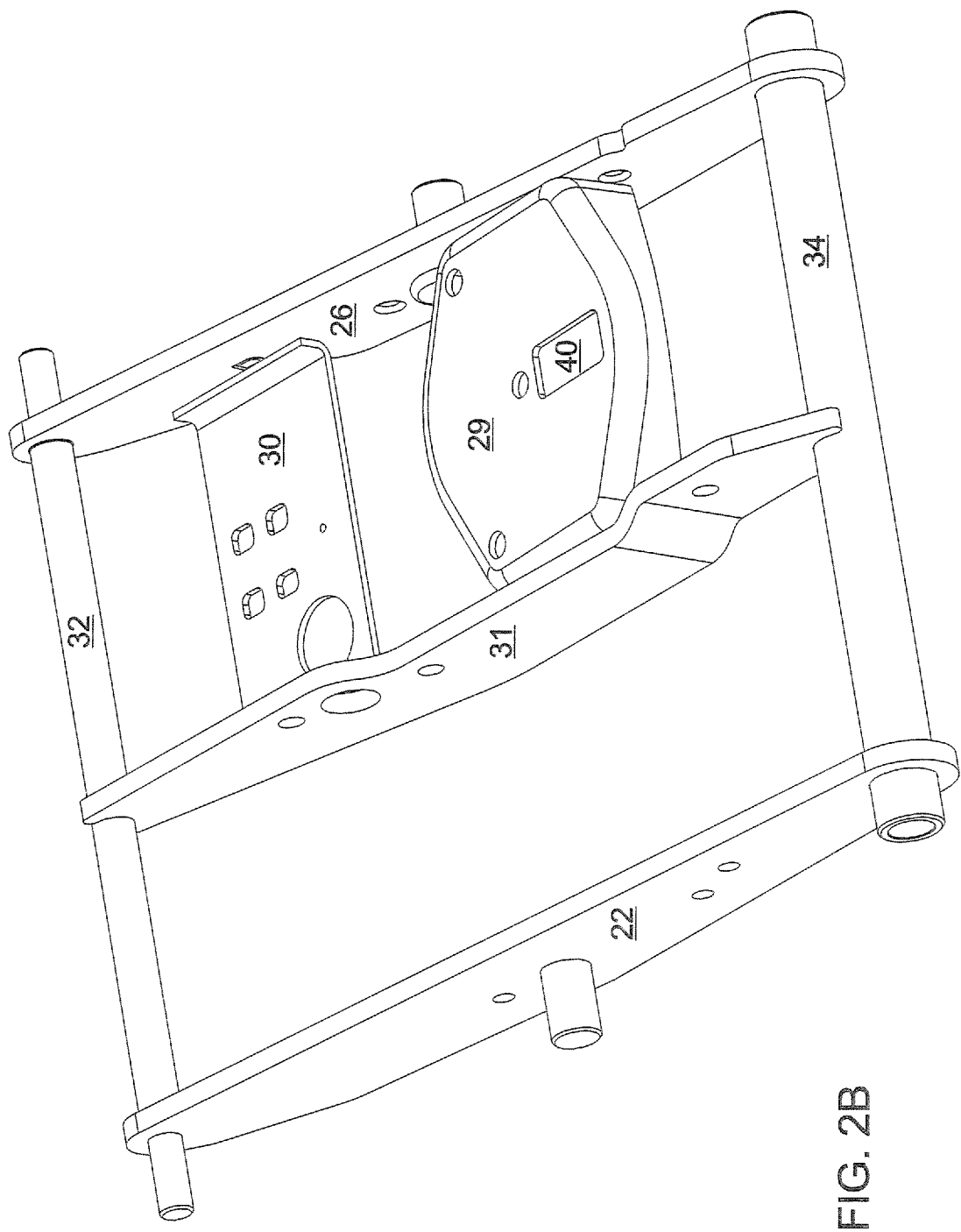
FIG. 2B is a perspective view of center X within the linkage system with parts removed for clarity.
Figure 2C:
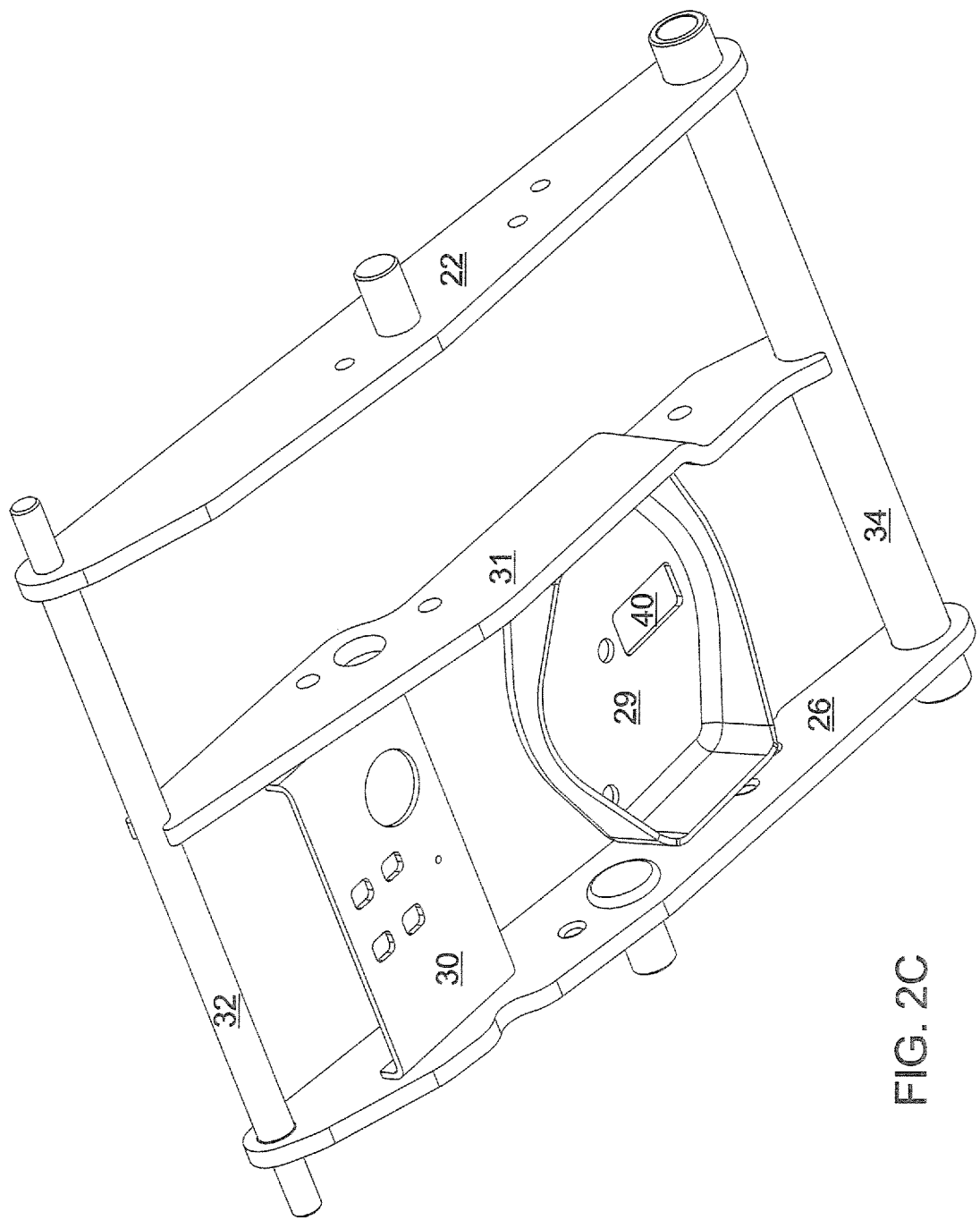
FIG. 2C is an additional perspective view of the attachment of center X within the linkage system.

Center linkage 30 moves with arms 22 and 26. FIGS. 2B-C further demonstrate the attachment of center linkage 30 and center cap 29 within the system. In most embodiments, center linkage 30 additionally includes a center support spine 31, which provides additional stiffness to the system. In certain embodiments, support spine 31 is a complete cross bar (not shown). In the embodiments where center linkage 30 extends along the upper length of the system and is connected to upper cross bar 32, a support spine 31 cross bar adds additional support. Nevertheless, a system without support spine 31 is contemplated. The shape of center linkage 30 allows electronics such as electronics for an air compressor or an optional solenoid valve assembly to be housed on the upper surface of center linkage 30 and control cables to be threaded through opening 40 in center cap 29. This housing of electronics allows further space condensation of suspension system 10. Although FIG. 2A demonstrates two pairs of outer linkage arms, the number of linkage arms is not meant to be limiting. An embodiment with only a single pair of linkage arms with center linkage 30 is contemplated. As is an embodiment with more than two pairs of linkage arms.

As shown in FIG. 3B, active suspension system 10 additionally includes at least one or more sensors, such as accelerometers. A lower accelerometer is attached to base housing 12, whereas an upper accelerometer can be attached to platform housing 14. Lower accelerometer generates an acceleration signal representing the simple vertical acceleration of base housing 12, i.e. incoming terrain inputs from the floor of the vehicle. Upper accelerometer measures resultant acceleration of the suspension system. If active suspension system 10 is working properly, the value of the resultant acceleration should be lower than the other measured accelerations. The type of accelerometer is not limiting and examples such as a commercially available silicon capacitive variation transducer are contemplated. A seat position sensor, such as a ratio-metric, rotary Hall-effect transducer, which measures the position of platform housing and can be mounted in the housing is also contemplated. A seat position sensor can detect the direction of motion, velocity and proximity to end-stop bumpers (not shown).

FIG. 3B demonstrates an example attachment of a controller 50 capable of receiving signals from accelerometers, and a seat position sensor. The placement of controller 50 is not meant to be limiting as long as it can receive sensor signals and control signal rotary actuator 52. In FIG. 3A and FIG. 3B, these signals are sent via wiring, however, wireless signal transmission is also envisioned. The control signal is not meant to be limiting and can be the one disclosed in U.S. patent application Ser. No. 16/667,796, herein incorporated by reference. The command sent to rotary actuator 52 is a determination of the velocity caused by the acceleration and then cancels most of that velocity, thus providing a rapid response and minimal acceleration of the seat. The strength of the signal is proportional to the magnitude of the movement. Controller 50 continually updates the control signal to rotary actuator 52 to prevent abrupt end stops and keep the acceleration transmitted to the operator to an absolute minimum.

Figure 4B:
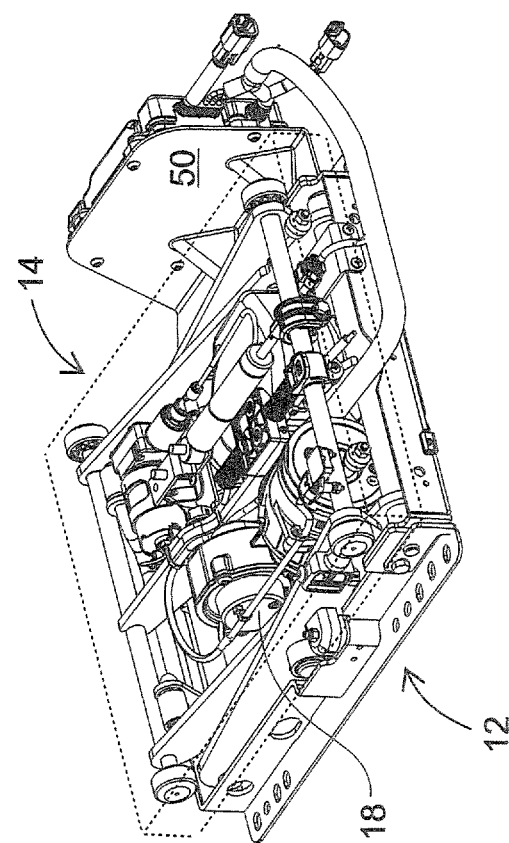
FIG. 4B demonstrates movement of the suspension system through a fully closed suspension system.
Figure 4A:
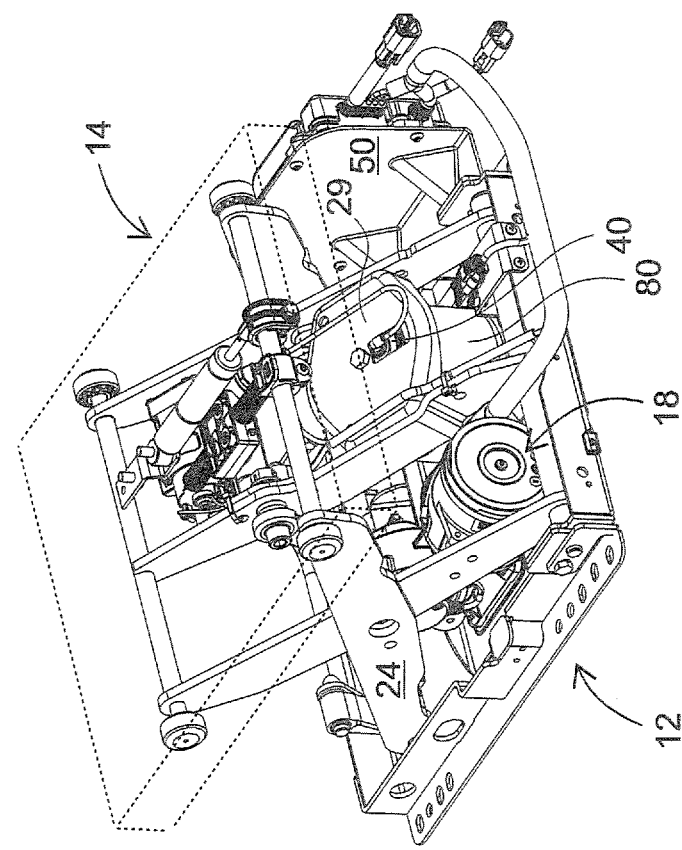
FIG. 4A demonstrates movement of the suspension system through a partially extended suspension system.

Rotary actuator 52 is permanently attached to base housing 12 between arms 22 and 24 and center linkage 30. When signaled by controller 50, rotary actuator 52 varies the spacial relationship between base housing 12 and platform housing 14 by moving linkage system 16. This arrangement allows movement of base housing 12 and platform housing 14 towards and away from each other to keep the acceleration transmitted to the operator to a minimum. As shown in FIG. 4, when platform housing 14 is in its lowest position, angle .THETA. is minimized. As linkage assembly is raised relative to base housing 12, angle .THETA. increases.

Figure 5:
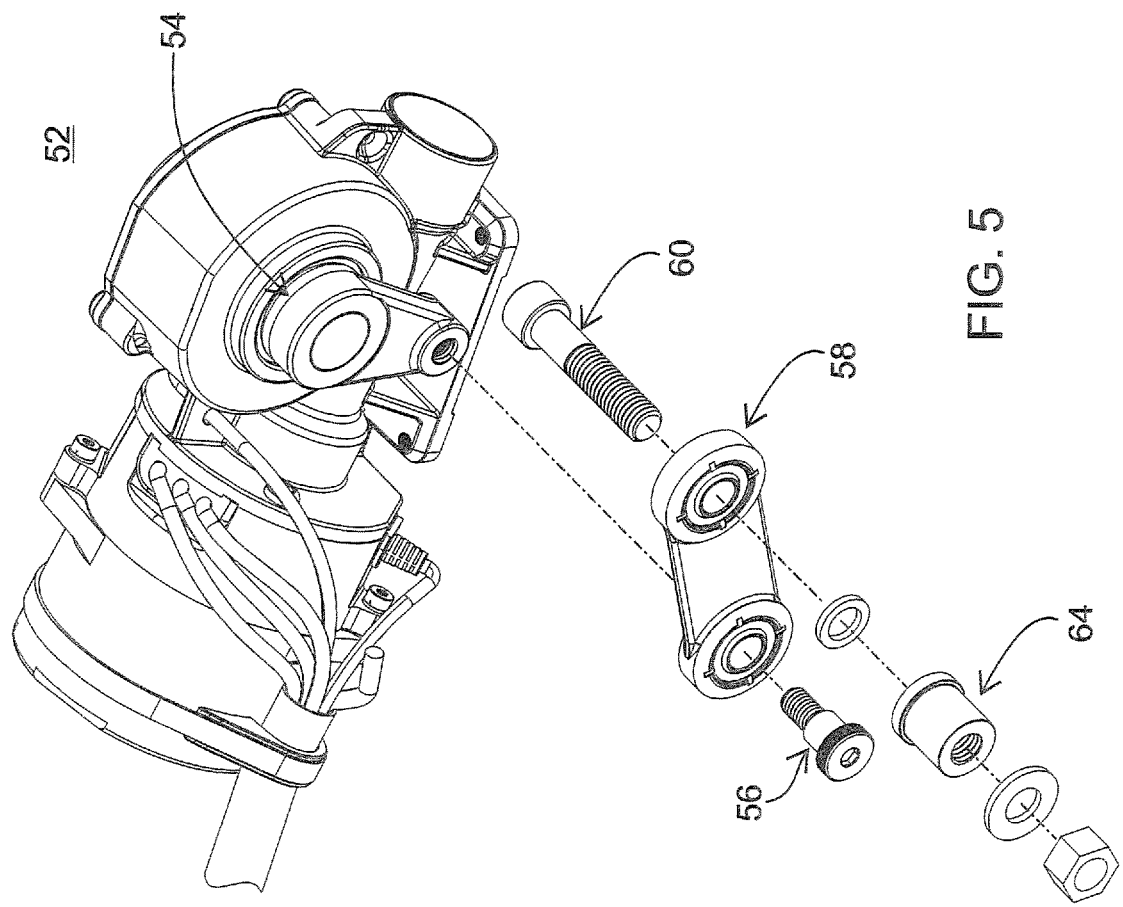
FIG. 5 is a perspective exploded view of the rotary drive actuator system.
Figure 6:
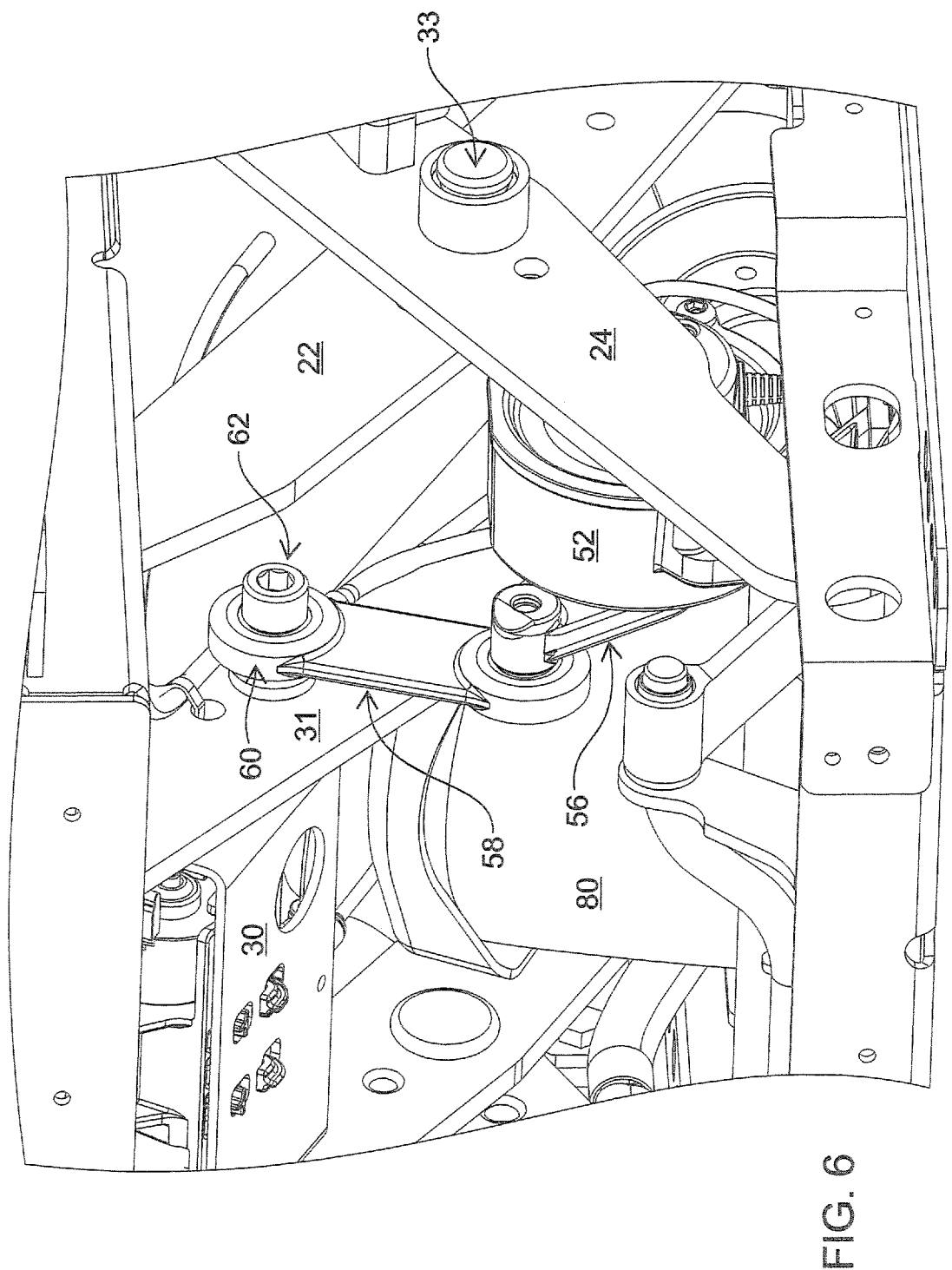
FIG. 6 illustrates the pivot of the components of the linkage system.
Figure 7:
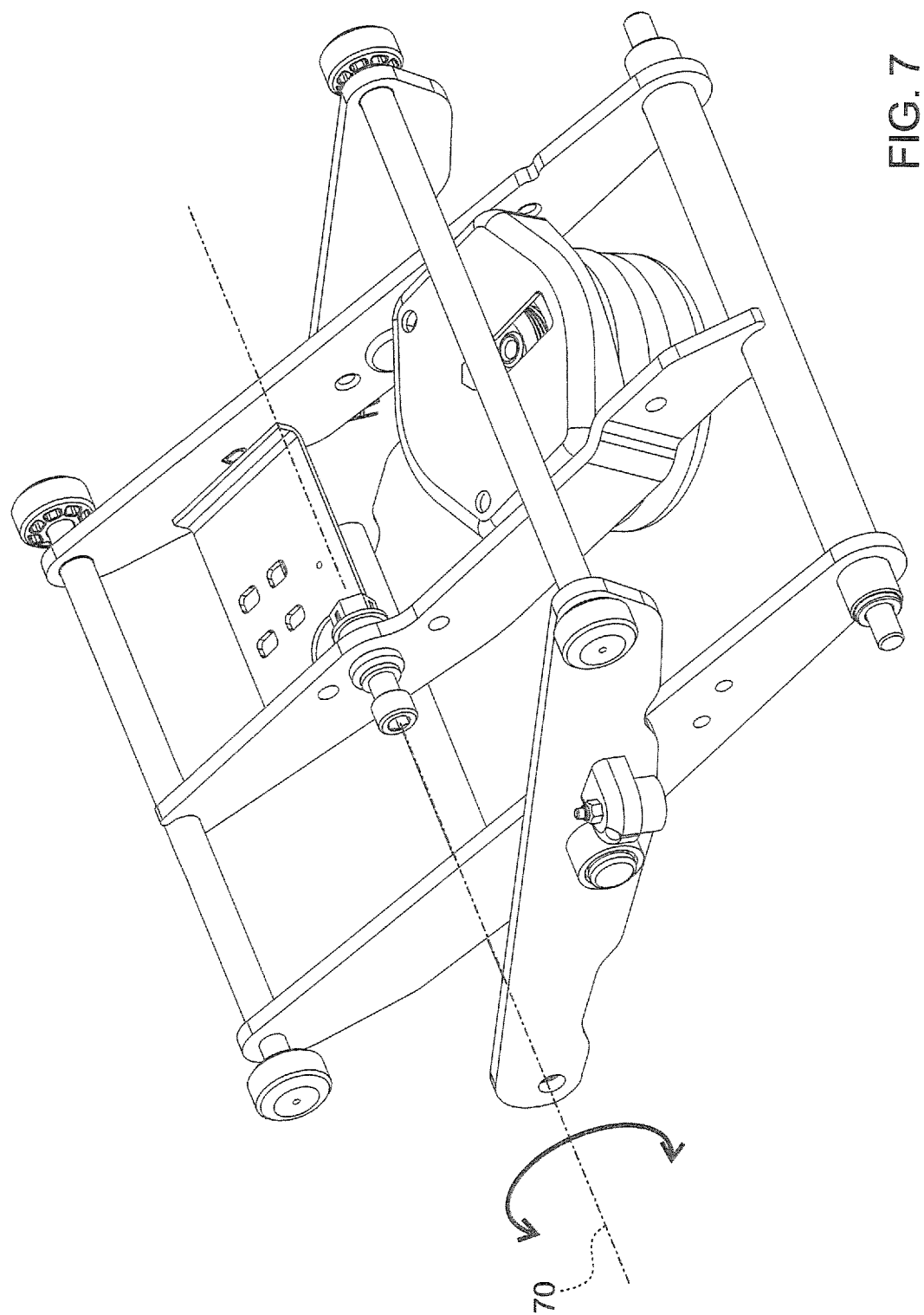
FIG. 7 is a close up of the connection between the rotary drive actuator system and the linkage system.
Figure 8:
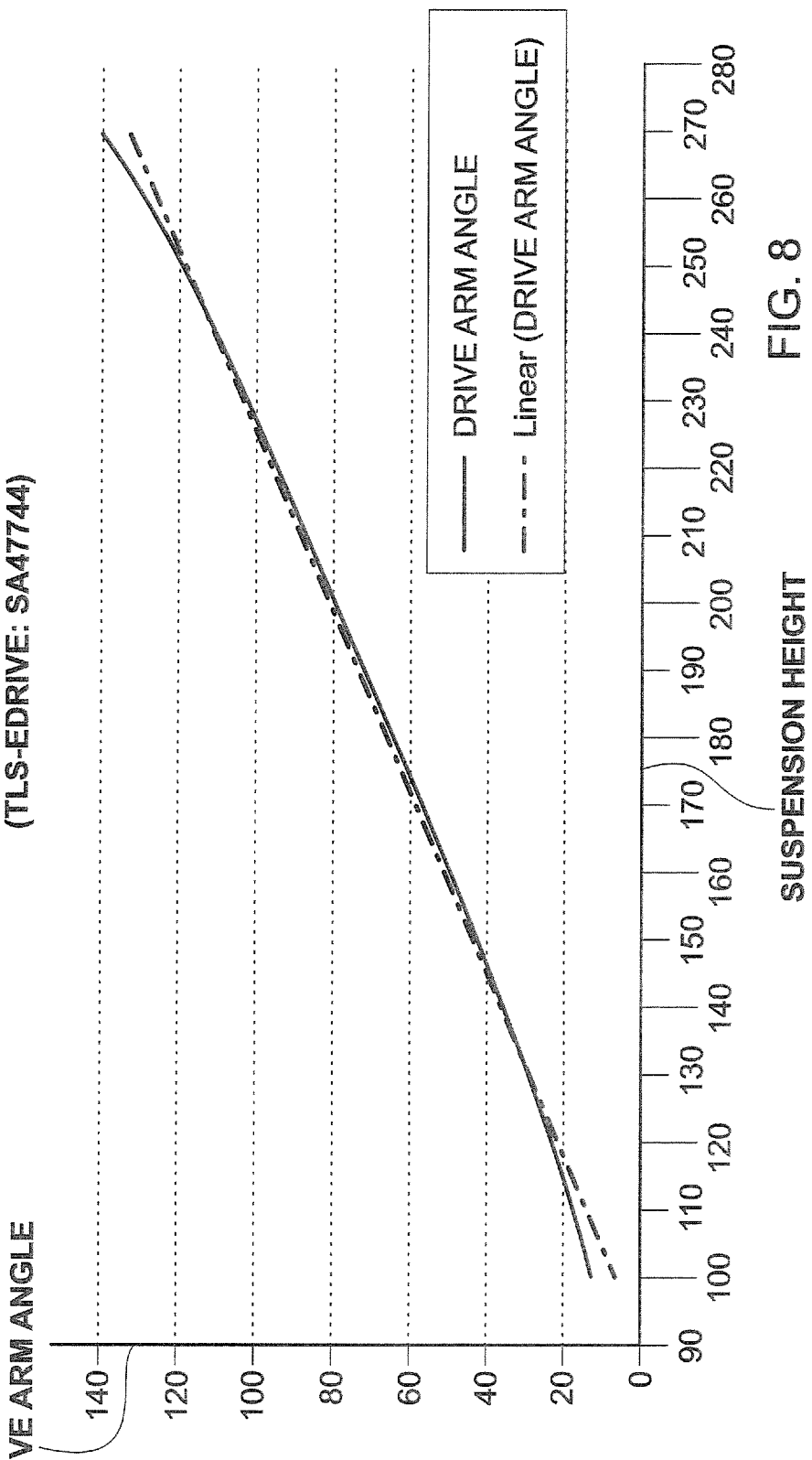
FIG. 8 is a graph demonstrating suspension height as a function of rotary drive actuator system angle.

In many embodiments, rotary actuator 52 is an electric motor. For example, rotary actuator 52 may be a worm-drive gearbox, such as that shown in FIG. 5. Rotary actuator 52 has output shaft 54 which projects outwardly from and rotates with respect to base housing 12. Rotary drive arm 56 is pivotally connected to output shaft 54 such that rotary movement of output shaft 54 causes rotary drive arm 56 to move in a circular motion up to a total angular travel of the rotary drive arm 56 to be about 145 degrees. However the skilled artisan understands that this degree of angular travel is an example only and in other embodiments, travel will be different degrees. Drive link 58 is rotationally attached to rotary drive arm 56 on one end and center linkage 30 through drive pivot 60 on the other. Drive link 58 contains spherical bearings 62 (not shown), 64 in most embodiments. Spherical bearings allow for angular misalignment, resulting in smooth quiet control in extreme terrain. Mounting drive link 58 to center linkage 30 allows for center-balanced mounting, which provides smooth ride control without linkage twist and its accompanying negatives. FIG. 6 shows actuator 52 connected to center linkage 30 through center spine 31. As demonstrated in FIG. 6, actuator drive arm is centrally mounted on center linkage 30 outside edge toward arms 22 and 24 along axis 70 (FIG. 7) between pivot point 33 and upper cross bar 32. Movement of rotary drive arm 56 results in corresponding movement of drive link 58, which then results in vertical movement of platform housing 14, which provides seat suspension to a seat occupant. Optimization in the geometry of rotary drive arm 56 and drive link 58 allows for near-linear relationship of the drive arm angle rotation to suspension vertical travel (FIG. 8). This near-linear relationship provides a substantially constant and equal force regardless of the position of the suspension so a user experiences a comfortable balanced ride.

Controller 50 algorithm can be adjusted adaptively if rotary actuator 52 does not respond in a linear manner to its command or if response varies over time. In other words, if the response of rotary actuator 52 in moving rotary drive arm 56 is slower or faster than desired, the constants can be changed to achieve the desired response. Suspension system 10 achieves consistent torque through applying torque to the system on demand, which in turn negates the effects of incoming terrain inputs into the system.

Figure 9:
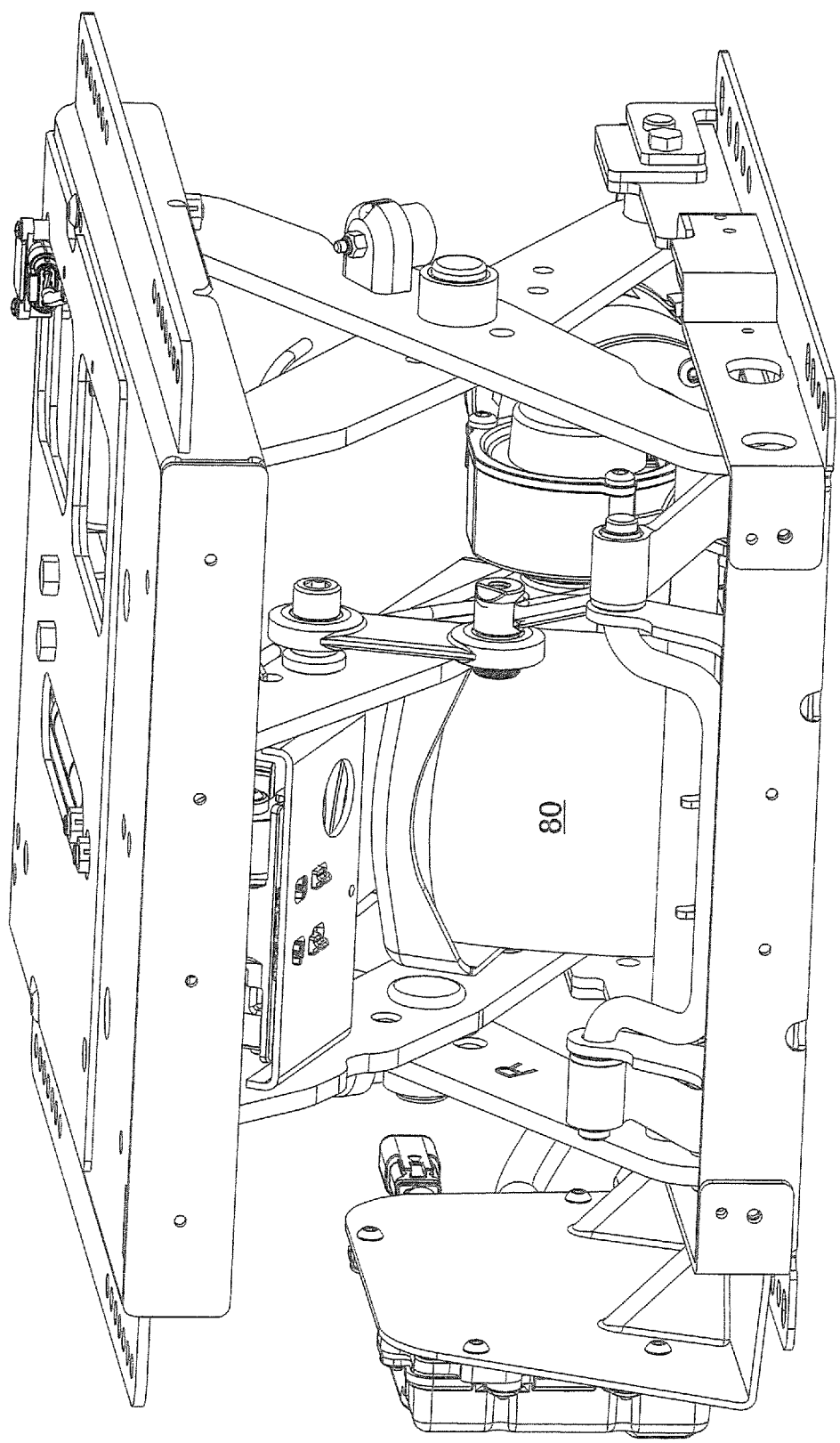
FIG. 9 is an alternative view showing the active suspension with an optional air spring.

Active seat suspension system 10 also includes an air spring 80 in many embodiments, such as the one shown in FIG. 9. Air spring 80 is positioned between base housing 12 and lower surface of center linkage 30. Air spring 80 is controlled by a compressor 82 on the upper surface of center linkage and provides equal and adequate support to center linkage 30 so as to provide a range of comfortable suspension for a seat occupant. In another embodiment, air spring 80 is positioned directly between base housing 12 and platform housing 14. The inclusion of air springs in suspension systems is well known in the art.

In yet other embodiments, a spring element may be separate from the air spring and comprise one or more mechanical tension springs. In all embodiments containing air spring elements, the tension in the air spring can be adjusted by any suitable means to allow for different drivers.

The present disclosure should be considered as illustrative and not restrictive in character. It is understood that only certain embodiments have been presented and that all changes, modifications and further applications, particularly in matters of shape, size, and arrangement of steps that come within the spirit of the disclosure are desired to be protected. The scope is defined in the language in which the appended claims are expressed.

What is claimed is:

1. An active vehicle seat suspension comprising a base housing; a platform housing; a linkage system moveably mounted between the base housing and the platform housing, wherein the linkage system comprises a center linkage having opposing ends; a rotary actuator drive system moveably connected to the center linkage, wherein the rotary actuator drive system moves the center linkage over a range of travel where at least one of the opposing ends has a vertical travel corresponding to a vertical movement of the platform housing; and a control system, wherein the control system actively signals the rotary actuator drive system to move the center linkage in a substantially linear relationship between an angle of rotation of the rotary actuator drive system and the vertical movement of the platform housing.

2. The active suspension system of claim 1 further comprising at least two sensors in operable communication with the control system, wherein the at least two sensors send a plurality of signals to the control system.

3. The active suspension system of claim 2 wherein the at least two sensors are an upper accelerometer and a lower accelerometer.

4. The active suspension system of claim 3 wherein the lower accelerometer measures a vertical acceleration of the base housing and sends a signal of this value to the controller.

5. The active suspension system of claim 3 or claim 4 wherein the upper accelerometer measures an acceleration of the active suspension system and sends a signal of this value to the controller.

6. The active suspension system of claim 1 further comprising a seat position sensor in operable communication with the control system, wherein the position sensor measures a direction of motion, a velocity or a proximity to end-stop bumpers of a seat and sends a signal of one or more of these values to the controller.

7. The active suspension system of claim 1 further comprising two pair of outer arms, wherein central linkage is movably connected to the two pair of outer arms and the two pair of outer arms move with center linkage.

8. The active suspension of claim 7 wherein the rotary actuator device system is connected to the base housing inside the at least two pairs of outer arms.

9. The active suspension of claim 1 wherein the rotary actuator device system is positioned such that base housing and platform housing directly touch when an angle THETA is minimized.

10. The active suspension of claim 1 wherein the rotary actuator device system comprises a rotary actuator, a rotary drive arm in movable contact with the rotary actuator, and a drive link in movable contact with the rotary drive arm.

11. The active suspension of claim 10 wherein the rotary actuator is a motor.

12. The active suspension of claim 1 wherein the drive link is in movable contact with the center linkage.

13. The active suspension of claim 1 wherein the angle of rotation of the rotary actuator device system is about 145 degrees when the active suspension system is in a most vertical position.

14. The active suspension of claim 1 further comprising a spring.

15. The active suspension of claim 14 wherein the spring is an air spring.

16. A method of adjusting an active suspension system comprising the steps of:
measuring a position and an acceleration of a platform housing;
measuring an acceleration of a base housing;
signaling the measurement of the position and acceleration of the platform housing and the acceleration of the base housing to a controller;
calculating a movement value based on a desired suspension position; and
activating a rotary actuator system to change the position of the active suspension system to the desired suspension position by moving a center linkage where at least one opposing end of the center linkage has a vertical travel corresponding to a vertical movement of the platform housing.

* * * * *